Oct. 31, 1950     C. R. TURNER     2,528,191
COOKING DEVICE
Filed March 22, 1948

Inventor:
Charles R. Turner
by his Attorneys
Howson & Howson

Patented Oct. 31, 1950

2,528,191

UNITED STATES PATENT OFFICE 2,528,191

COOKING DEVICE

Charles R. Turner, Enfield, Pa., assignor to Proctor Electric Company, Philadelphia, Pa., a corporation of Pennsylvania Application March 22, 1948, Serial No. 16,319

6 Claims. (Cl. 219—44)

This invention relates to thermostatically controlled cooking devices wherein the cooking operation is accompanied by the generation of steam in a cooking vessel. The invention further relates to improvements in thermostatically controlled devices for heating water, and it will be described with reference thereto.

There are several cooking operations normally performed at the dining table in which a supply of hot or boiling water is used. Among these cooking operations are the preparation of tea, the preparation of coffee by either the drip or dissolved powder methods, the preparation of bouillon, and others. Before the invention of automatic tea kettles of the type disclosed in Patent No. 2,350,941, issued June 6, 1944, to R. O. Stevenson, it was customary for the housewife or cook to heat such water in a suitable vessel on a stove. The automatic tea kettle here mentioned provides a supply of water at or near the boiling temperature without wasted electrical energy such as would be wasted when water is heated by normal means, as on a stove.

It has been found desirable to provide an electrically heated table appliance in which water may be heated and maintained near its boiling temperature. It has been further found desirable to incorporate a temperature-controlling thermostat with the heating vessel and eliminate thereby the need for a large associated and cooperating base structure such as is shown in the Stevenson patent. Also considered desirable is a suitable housing, within the handle of the appliance, in which the controlling thermostat may be located.

One object of the present invention is to provide an improved cooking device of the general character above mentioned.

Another object of the invention is to provide a thermostatically-controlled electric water heating table appliance which will economically maintain a supply of water at or near the boiling temperature.

A further object of this invention is the provision of a thermostatic control in the handle of a water heating table appliance, the thermostatic control being operated by the steam resulting from the ebullition of the heated water.

A still further object of this invention is the provision of condensate returns from the thermostat chamber to the boiling chamber such that moisture condensed in the thermostat chamber will be gravitationally returned to the boiling chamber.

Still another object of the invention is the provision of ventilating passages to and from the thermostat chamber and the surrounding atmosphere which will make the thermostat more sensitive to the presence of vapor, aid the evaporation of condensed moisture on the thermostat and so placed that moisture condensed within the chamber will not drip from that chamber to the outside of the vessel.

Other objects and features of the invention will be readily apparent from the following description of the illustrated embodiment and from the accompanying drawings, in which.

Figure 1:
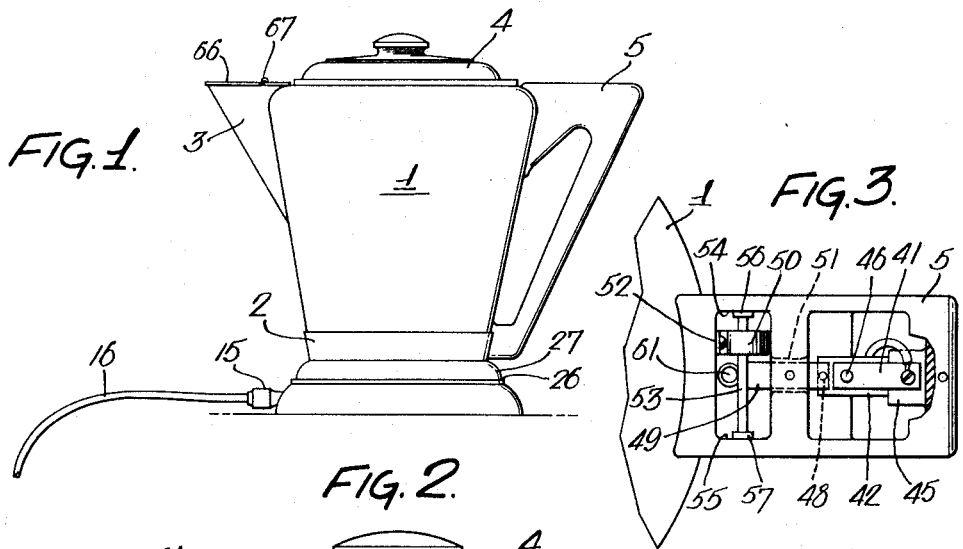
Fig. 1 is an elevational view of a table water-heating appliance embodying the invention.
Figure 3:
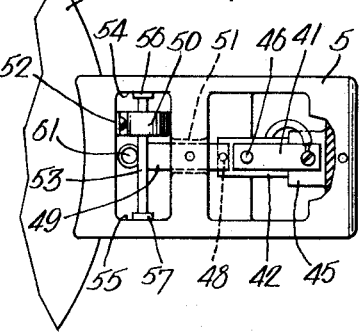
Fig. 3 is a fragmentary plan view showing the handle structure with the cover thereof removed.

Referring first to Fig. 1, a water heating vessel 1 in the form of a table appliance is shown, having a base 2, a spout 3, a hinged lid 4 and a handle 5. In the base 2, shown in detail in Fig. 2, a metal base section having a suitable decorative shape is formed with a shoulder 6. An interior contact guide piece 7, formed of a suitable ceramic or molded plastic is disposed on the shoulder 6. Formed down from the underside 8 of the piece 7 is a socket attachment flange 9, to which the plug socket 10 is secured. The socket 10, which is inserted in a suitable opening of the base 2, is secured to the flange 9 by means of the shoulders 11 on the male members 12 and the nuts 13 on the threaded end 14 of the members 12. These male current carrying members 12 are engaged by suitable sockets on the plug 15 which is attached to a conductor cord 16. Connected to one of the members 12, a spring leaf 17 serves to hold a contact 18 in a centrally located hole 19 of the piece 7. The current carrying spring leaf is biased upwardly to retain the contact 18 in the hole 19. A similar spring leaf 20 is mounted at 21 and supports a contact 22 in the hole 23. The hole 23 communicates with the annular groove 24 concentric about the hole 19, the purpose of which will presently be described. A wire 25 connects one of the contact members 12 and spring leaf 20.

Figure 2:
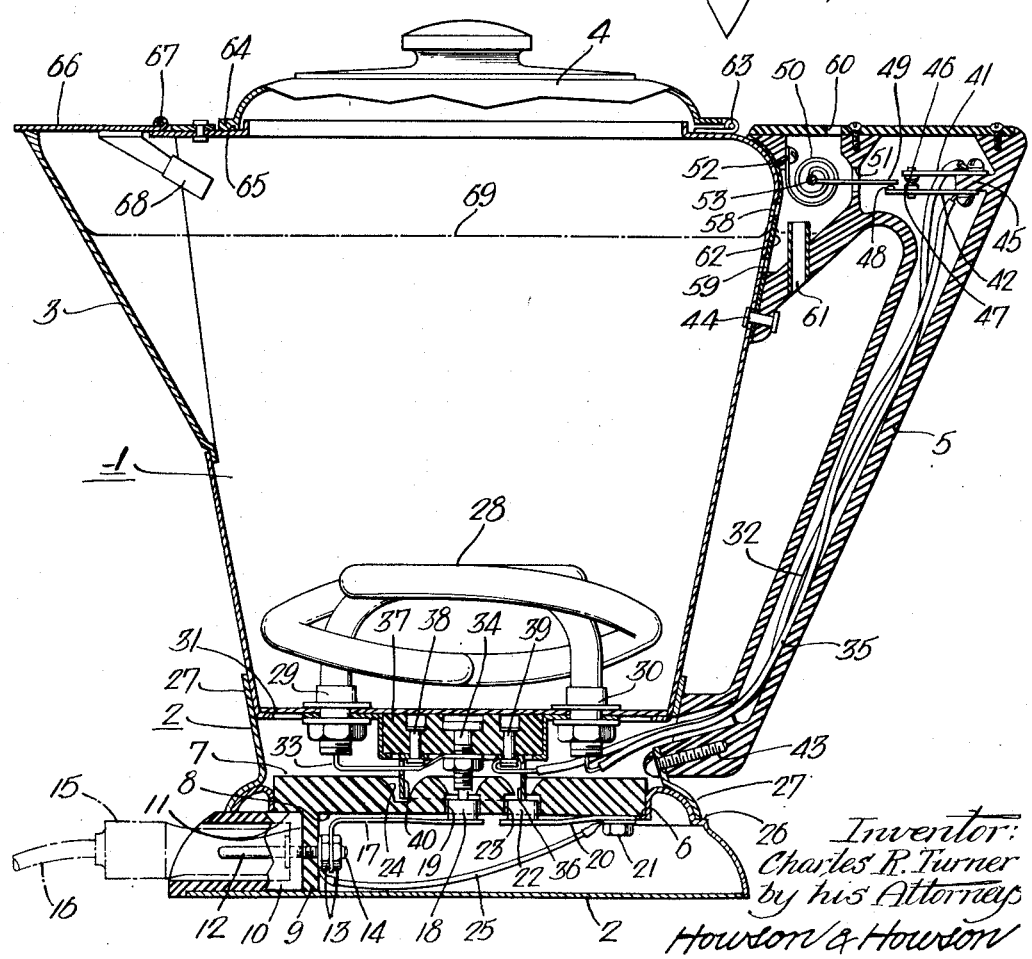
Fig. 2 is a vertical sectional view along the axis of symmetry of the vessel showing the component elements of the device.

Resting on the base 2, as shown best in Fig. 2, at the shoulder 26 is the upper portion of the appliance. The lower portion 27 of the vessel 1 is so formed of sheet metal as to engage the shoulder 26 of the base 2 and to dispose the vessel in spaced relationship to the plate 7. There is a heating element 28, located in the bottom of the vessel so as to be covered when there is water in the vessel. This heating element may be any of the common immersion type heaters which are presently available, and is secured in the bottom of the vessel in water-tight attachment at 29 and 30 by suitable fittings. Passing through the bottom 31 of the vessel, the ends of the element terminate in conducting wires 32, 33. These wires 32, 33 are connected as shown in Fig. 2, one leading up through the hollow handle 5 and the other to a centrally located contact stud 34. The wire 32 leading up into the handle leads to a steam-operated thermostat switch, to be presently described. A wire 35 returns therefrom and is attached to a terminal plate 36 which is held to an insulating block 37 by means of rivets 38, 39 and has a circular flange 40 of diameter to nest in groove 24 and to be engaged by contact 22.

When the vessel 1 rests on the base 2, the circuit to the heating element is established from one of the socket members 12 through the spring leaf 17 and contact 18 to the central stud 34 which is connected by wire 33 to one end of the heating element. From the other end of the heating element, the circuit is through the thermostat switch 41, 42 to the terminal plate 36 and its flange 40. The flange 40 engages the contact 22 in the groove 24 and the circuit is completed by spring leaf 20 and wire 25 to the other socket member 12.

The handle 5 is hollow as clearly shown in the drawing and may be made of low heat conducting material, such as phenol formaldehyde. As is shown, the handle is held to the vessel by a screw 43 at its lower end and a suitable rivet or rivets 44 at its upper end. Disposed in the upper portion of the handle, mounted on a boss as at 45, are the current-carrying switch arms 41, 42. The upper arm 41 is of substantial stiffness, and carries a contact 46 at its end. The lower arm 42 is of considerably less stiffness, being spring biased upwards. A contact 47 is located on arm 42 to engage contact 46. The arm 42 extends beyond contact 47 to support a rounded bearing piece 48 of ceramic or plastic to suitably insulate the arm 42 from the lever 49. There is located in the top of the handle, in a chamber separate from that containing the blades 41, 42, a spirally coiled bimetallic thermostat 50. A small slot-like opening 51 places the two chambers in communication, but is primarily to accommodate the lever 49. The bimetal thermostat 50 is mounted at 52 and is centrally secured to a rotatable shaft 53. The shaft 53 is rotatably supported by the side walls 54, 55 by means of suitable journals 56, 57 with the lever 49 directly alongside the thermostat. The lever 49 is thus operable by the thermostat 50, between the limits of the top and bottom of the opening 51 to actuate switch arm 42.

Opening into the thermostat chamber, from the interior of the vessel are two orifices 58, 59 of relatively small diameter. The purpose of the upper of these orifices is to permit steam vapor to pass from the vessel into the thermostat chamber while condensate formed in the thermostat chamber may drain back into the vessel through the lower orifice. A vent opening 60 is provided in the top of the thermostat chamber, and so located that steam issuing from the vessel into the thermostat chamber through orifices 58, 59 will pass over at least a part of the thermostat 50 before escaping through the vent 60. Entering into the thermostat chamber from the bottom thereof is a draft tube 61. This tube extends upward into the chamber substantially above the lower orifice 59. The tube 61 is so positioned relative to the thermostat bimetal 50 and the vent 60 so that any draft of air flowing through the thermostat chamber will pass over the thermostat. To prevent condensate formed in the thermostat chamber from seeping beneath the handle and running down the exterior of the vessel, a gasket 62 of suitable material such as synthetic rubber, is placed between the handle and the vessel.

As shown in Fig. 2, the lid 4 of the vessel 1 is hinged to the vessel at 63 and rests all around its edge 64 on a shoulder 65 formed in the top of the vessel. There is provided over the spout 3 a cover plate 66 hinged at 67 and counterbalanced at 68 so as to open as the vessel is tilted into pouring position. The cover plate is so balanced as to remain closed when the vessel is in the normal position.

In operation of this appliance, the base 2 is placed on the table, or wherever it is desired to be used, and its supply conducting cord 16 plugged into the nearest electrical outlet. Unless the vessel is placed on the base no current can flow. The vessel may be filled with water to the level indicated by the dot and dash line 69, and should not be higher than the bottom of orifice 58. When the vessel is placed on the base, the heating element 28 is energized because of the circuit established when the stud 34 and ring 40 engage contacts 18 and 22. The heat generated by the heating element heats the water until the water boils. At the first boiling, steam is generated above the water in the vessel, and because of the relatively vapor tight seals of the lid and spout cover, the steam is directed through orifice 58 into the thermostat chamber. The steam, in escaping from that chamber, flows out through opening 60 and the flow of steam across the thermostat will cause it to rotate the lever 49 in clockwise direction to open the switch contacts 46, 47.

As the contacts 46, 47 are opened, the circuit to the heating element is broken and the heat supply to the water ceases. The result of this is a decreased boiling rate and eventual cessation of the flow of steam vapor to the thermostat chamber. The vapors in the chamber, as the chamber looses its heat to the atmosphere, etc. will condense on the chamber walls and on the thermostat. Any condensate that drops or flows in the chamber cannot drip out of the chamber because of the disposition of the venting and circulation openings. Any condensate which drops or flows in the chamber will return to the vessel through orifice 59. The tube 61 serves as a director of the warm air which rises along the outside of the heated vessel into the thermostat chamber. This air flow is relatively small but will exist to reduce somewhat the condensate formed in the chamber. As the thermostat cools, it rotates the lever 49 in a counterclockwise direction to re-establish contact of the switch contacts 46, 47. As this contact is made, the heater is re-energized to repeat the cycle. The temperature at which the contacts make and break may be so chosen to keep the temperature of the water in the vessel close to boiling.

While a specific form of the invention has been disclosed and described, it should be understood that the invention is not limited to this specific form but is capable of various modifications and may be applied to devices other than table appliances.

I claim:

1. In combination, a cooking vessel, electric heating means arranged to heat the contents of said vessel, means forming a relatively small chamber external to said vessel and adjacent the upper portion thereof, said chamber being constructed and arranged to collect condensate and return the same to said vessel, said vessel and chamber being in communication to permit vapor and steam to enter said chamber from said vessel and for conveying condensate back to said vessel, thermo-responsive means in said chamber for controlling said heating means, means for creating an air draft through said chamber, and means associated with said air draft-creating means for preventing flow of condensate through said air draft-creating means while permitting flow of condensate back to said vessel.

2. In combination, a cooking vessel, electric heating means arranged to heat the contents of said vessel, means forming a relatively small chamber external to said vessel and adjacent the upper portion thereof, said chamber being in communication with said vessel to permit vapor and steam to enter said chamber from said vessel and also to convey condensate back to said vessel, thermo-responsive means in said chamber for controlling said heating means, means for creating an air draft through said chamber, said means including at least one aperture in each of the upper and lower walls of said chamber, and means in said chamber to prevent flow of condensate through said aperture in said lower chamber wall.

3. In a cooking device, a vessel, electric heating means arranged to heat the contents of said vessel, means forming a relatively small chamber external to said vessel and adjacent the upper portion thereof, said chamber being in communication with said vessel through a plurality of openings which serve to admit vapor and steam to said chamber, at least one of said openings being at the bottom of said chamber so as to return condensate to said vessel, thermo-responsive means in said chamber for controlling said heating means, said chamber having openings in the top and bottom thereof to establish an air draft through said chamber, and a tube extending upward within said chamber from the bottom one of the last-mentioned openings to prevent the escape of condensed moisture from said chamber except into said vessel.

4. In a water-heating table appliance, a vessel, electric heating means arranged to heat the contents of said vessel, a handle secured to said vessel and having a portion adjacent the upper part of the vessel, said portion of the handle being hollow and forming a small chamber, said chamber being in communication with said vessel to admit vapor and steam to said chamber and also to convey condensate back to said vessel, thermo-responsive means in said chamber for controlling said heating means, means for establishing an air draft through said chamber and means associated with said air draft-establishing means for preventing flow of condensate through said air-draft-establishing means while permitting flow of condensate back to said vessel.

5. In a water-heating table appliance, a vessel, electric heating means arranged to heat the contents of said vessel, a handle secured to said vessel and having a portion adjacent the upper part of the vessel, said portion of the handle being hollow and forming a small chamber, said chamber being in communication with said vessel to admit vapor and steam to said chamber, there being at least one opening at the bottom of said chamber so as to return condensate to said vessel, thermo-responsive means in said chamber for controlling said heating means, said chamber having openings in the top and bottom thereof to establish an air draft through said chamber, and means associated with the bottom one of the last-mentioned openings to prevent the escape of condensed moisture from said chamber except into said vessel.

6. In a water-heating table appliance, a vessel, electric heating means arranged to heat the contents of said vessel, a handle secured to said vessel and having a portion adjacent the upper part of the vessel, said portion of the handle being hollow and forming a small chamber, said chamber being in communication with said vessel to admit vapor and steam to said chamber, there being at least one opening at the bottom of said chamber so as to return condensate to said vessel, thermo-responsive means in said chamber for controlling said heating means, said chamber having openings in the top and bottom thereof to establish an air draft through said chamber, and a tube extending upward within said chamber from the bottom one of the last-mentioned openings to prevent the escape of condensed moisture from said chamber except into said vessel.

CHARLES R. TURNER.

REFERENCES CITED

The following references are of record in the file of this patent:

UNITED STATES PATENTS

| Number | Name | Date |
| --- | --- | --- |
| 888,151 | Fiddes et al. | May 19, 1908 |
| 2,310,044 | Stevenson | Feb. 2, 1943 |
| 2,350,941 | Stevenson | June 6, 1944 |
| 2,422,974 | Newell | June 24, 1947 |